(12) United States Patent
Toncelli

(10) Patent No.: US 11,938,652 B2
(45) Date of Patent: Mar. 26, 2024

(54) PLANT AND METHOD FOR THE PRODUCTION OF SLABS MADE OF COMPOSITE STONE MATERIAL FROM A MIX

(71) Applicant: Dario Toncelli, Bassano del Grappa (IT)

(72) Inventor: Dario Toncelli, Bassano del Grappa (IT)

(73) Assignee: Dario Toncelli, Bassano del Grappa (IT)

( * ) Notice: Subject to any disclaimer, the term of this patent is extended or adjusted under 35 U.S.C. 154(b) by 29 days.

(21) Appl. No.: 17/619,386

(22) PCT Filed: Jun. 23, 2020

(86) PCT No.: PCT/IB2020/055900
§ 371 (c)(1),
(2) Date: Dec. 15, 2021

(87) PCT Pub. No.: WO2020/261103
PCT Pub. Date: Dec. 30, 2020

(65) Prior Publication Data
US 2022/0297343 A1    Sep. 22, 2022

(30) Foreign Application Priority Data
Jun. 27, 2019   (IT) .................. 102019000010290

(51) Int. Cl.
*B28B 3/02*    (2006.01)
*B28B 3/12*    (2006.01)
*B28B 15/00*   (2006.01)

(52) U.S. Cl.
CPC .............. *B28B 3/022* (2013.01); *B28B 3/123* (2013.01); *B28B 15/00* (2013.01)

(58) Field of Classification Search
CPC ............ B28B 3/022; B28B 3/123; B28B 3/12
See application file for complete search history.

(56) References Cited

U.S. PATENT DOCUMENTS

| | | | |
|---|---|---|---|
| 1,888,398 A | 11/1932 | Strickland | |
| 2008/0260883 A1* | 10/2008 | Toncelli | B29C 67/244 425/88 |
| 2021/0114253 A1* | 4/2021 | Horvath | B28B 13/0235 |

FOREIGN PATENT DOCUMENTS

| | | |
|---|---|---|
| CN | 109693301 A | 4/2019 |
| DE | 458230 C | 4/1928 |

(Continued)

OTHER PUBLICATIONS

PCT International Search Report and Written Opinion dated Oct. 13, 2020 for Intl. App. No. PCT/IB2020/055900, from which the instant application is based, 11 pgs.

*Primary Examiner* — Arrie L Reuther
*Assistant Examiner* — Virak Nguon
(74) *Attorney, Agent, or Firm* — Fredrikson & Byron, P.A.

(57) ABSTRACT

Plant (2) for the production of slabs made of composite stone material from a mix (M) containing granules of stone or ceramic or glass material and a binder, comprising at least one temporary support or mould (S), a distributor for the mix (M) designed to distribute a layer of mix (M) on the temporary support or mould (S), a station (4) for performing compaction by means of vacuum vibro-compression of the mix (M) arranged on the temporary support or mould (S) and a station for hardening the mix (M) so as to form the finished slabs. The plant (2) comprises a device (1) positioned downstream of the distributor and upstream of the compaction station (4) and comprising means (16) which act on the top surface of the mix (M) for pre-compaction and levelling of the mix (M) arranged on the temporary support or mould (Continued)

(S). The invention also relates to a method for the production of slabs of composite stone material from a mix (M).

18 Claims, 5 Drawing Sheets

(56) References Cited

FOREIGN PATENT DOCUMENTS

| | | | | |
|---|---|---|---|---|
| EP | 1375097 B1 * | 3/2007 | ............. | B28B 15/00 |
| EP | 2045058 A1 * | 4/2009 | ............... | B28B 7/44 |
| EP | 2045058 A1 | 4/2009 | | |
| EP | 2310189 B1 * | 1/2015 | ............. | B28B 11/24 |
| EP | 2310189 B1 | 1/2015 | | |
| KR | 20130052772 A | 5/2013 | | |
| KR | 20140052772 A * | 5/2013 | | |
| WO | 2004039547 A1 | 5/2004 | | |
| WO | 2006045728 A1 | 5/2006 | | |
| WO | 2007042479 A1 | 4/2007 | | |
| WO | 2012017401 A1 | 2/2012 | | |

\* cited by examiner

PLANT AND METHOD FOR THE PRODUCTION OF SLABS MADE OF COMPOSITE STONE MATERIAL FROM A MIX

RELATED APPLICATIONS

This application is a 35 U.S.C. 371 national stage filing from International Application No. PCT/IB32020/055900, filed Jun. 23, 2020, which claims priority to Italian Application No. 102019000010290, filed Jun. 27, 2019, the teachings of which are incorporated herein by reference.

FIELD OF THE INVENTION

The present invention relates to a plant for the production of slabs of composite stone material from a mix. In particular, the mix contains granules of stone or ceramic material and a binder.

Secondly, the invention relates to a method for the production of slabs of composite stone material from the mix.

BACKGROUND

For some time methods and plants for the production of slabs of composite stone material have been known where a mix consisting substantially of granules and dust particles of stone or ceramic material and a binder is initially distributed on a temporary support or mould.

Then the support containing the mix is transferred to a compaction station, preferably a station for performing compaction by means of vacuum vibro-compression, and to a station for hardening the mix, the characteristic features of which vary depending on the type of binder used in the mix. For example, the binder may be of the cementitious type or may consist of a synthetic resin.

The step of depositing and distributing the mix inside the supports is performed by means of suitable deposition devices, otherwise referred to as "distributors" of the volumetric or weighing type. The distributors of the weighing type, which are generally currently preferred in the industry, generally comprise a hopper which is designed to be filled with a predetermined amount of mix and an extraction element, preferably a conveyor belt, which is positioned at the outlet of the hopper for transporting the mix downstream towards the supports.

The supports and the distributor move relative to each other so as to allow the deposition and distribution of the mix over the whole area of the support.

For example, a movable distributor and a stationary supporting surface for the supports may be provided, or alternatively a stationary distributor and a movable supporting surface for the supports formed by a conveyor belt may be provided.

For example, the documents EP1556197 and EP1802430 disclose distributors for deposition of the mix in the supports of the type indicated above.

EP1556197 describes a mix distributor with a hopper comprising load cells for detecting the weight of the mix to be loaded and a funnel element located at the end of the extractor belt for distributing by means of gravity the mix inside the supports.

EP1802430 describes a mix distributor in which the hopper comprises a shaped internal wall lined with a non-adhesive material. The shaping of the wall has the function of guiding and conveying the mix towards the distributor outlet.

Moreover, this distributor may have, at the end of the extractor belt, a funnel inside which the mix is poured by means of gravity and a pair of rotating rollers, downstream of the funnel, which are designed to eliminate the lumps of mix by means of crushing. The presence of these lumps is not desirable for the following vibro-compression step and in the final slab.

The compaction step, which is preferably performed by means of vacuum vibro-compression of the mix, following the distribution step, is performed by means of a press of the type described for example in the document EP2601024.

Advantageously, this type of press comprises a bell member movable vertically so as to define a chamber inside which the vacuum is created and a supporting surface for the support containing the mix.

Furthermore, the press comprises a ram movable with respect to the supporting surface between a raised rest position and a lowered position for making contact with the mix in order to compact it.

The ram preferably comprises a series of vibrating devices which are designed to generate a vibrating movement for compacting the mix contained in the support.

Finally, the mix hardening step may be performed by inserting the rough slab obtained from compacting inside an oven, in the case where the binder is a synthetic resin.

A first drawback of these solutions consists in the fact that the mix compaction step requires particularly long processing times and represents a so-called "bottle neck" for the entire slab production procedure. Therefore, this drawback results in an increase in the costs and the overall machining time.

A further drawback consists in the fact that the slabs obtained by means of plants which use the distributors, the presses and the hardening stations described above may have porous zones consisting of small bubbles with residual air trapped inside them. The porous zones are located generally in the region of any superficial depressions in the layer of mix to be compacted.

Furthermore, another drawback consists in the fact that the slabs obtained by means of the aforementioned methods and plant may have a non-uniform aesthetic appearance.

The main cause of these problems is the fact that the mix is not always distributed uniformly on the supports and that the press does not always manage to eliminate entirely any non-uniform zones of the mix.

In order to solve at least partially these problems plants have been developed where the step of deposition and distribution of the mix on the supports is performed by means of rolling of the mix.

For example, 102018000008696 discloses a mix distributor designed to be mounted in a plant for the production of slabs and comprising two rolling rolls and a sliding chute for conveying the mix from the hopper to the support.

This distributor, although it is used and is popular in the sector, has the drawback that it has a particularly complex structure and particularly high manufacturing costs.

A further drawback of this distributor is that it is extremely bulky and its assembly in pre-existing plants for the production of slabs is often impossible and in any case particularly complex.

BRIEF SUMMARIES OF OBJECTS OF THE INVENTION

The main object of the present invention is to provide a plant and a method for the production of slabs of composite stone material from a mix, which are able to solve the aforementioned problems.

One task of the present invention is to provide a plant for the production of slabs of composite stone material, which is able to speed up the compaction step.

Another task of the present invention is to provide a plant for the production of slabs of composite stone material which avoids the formation of porosity in the slabs, in particular on their surface.

A further task of the present invention is to provide a plant for the production of slabs of composite stone material which is able to obtain uniform and regular aesthetic effects over the whole surface of the slabs.

Another task of the present invention is to provide a plant for the production of slabs which has a simple and compact structure and a low cost.

Another task of the present invention is to provide a method for the production of slabs of composite stone material which has a shorter machining time compared to the known methods of the prior art.

The aforementioned object and tasks are achieved with a plant for the production of slabs of composite stone material according to claim 1 and with a method for the production of slabs of composite stone material according to claim 16.

BRIEF DESCRIPTIONS OF THE DRAWINGS

In order to illustrate more clearly the innovative principles of the present invention and its advantages compared to the prior art, an example of embodiment will be described below with the aid of the accompanying drawings. In the drawings.

DETAILED DESCRIPTION OF EMBODIMENTS OF THE INVENTION

With reference to the figures, the present invention relates to a plant 2 for the production of slabs of composite material from a mix M and comprising a device, denoted overall by the reference number 1 and described in detail below.

The mix M contains granules of stone or ceramic or glass material and a binder and the slabs are obtained by means of compaction using vacuum vibro-compression, and hardening of the mix.

Figure 1:
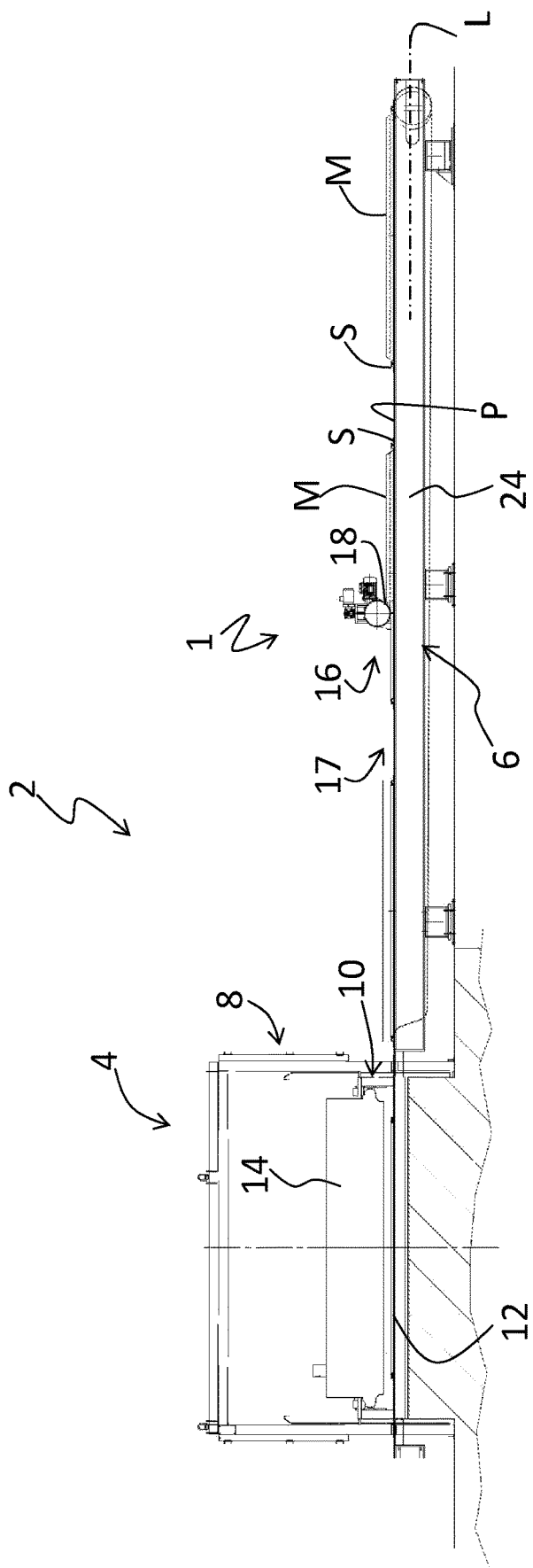
FIG. 1 shows a partial longitudinal view of a plant for the production of slabs of composite stone material according to the present invention.

The plant is shown partly in FIG. 1 and comprises at least a temporary support or mould S, a mix distributor—not shown in the figures—able to distribute a layer of mix M on the temporary support or mould S, a station 4 for compacting the mix distributed on the supports so as to obtain rough-formed slabs and a station for hardening the mix so as to obtain the hardened slabs, also not shown in the figures. Advantageously, the mix distributor forms part of a deposition and distribution station.

Moreover, the plant 2 comprises means 6 for feeding the supports S containing the mix M from the distributor to the hardening station along a predetermined feeding direction L. For example, the feeding means 6 may comprise a conveyor belt.

FIG. 1 shows a plant 2 which shows only the device 1 and the compaction station 4 and in which the supports S are fed from right to left by means of the feeding means 6. The mix distributor and hardening station are of the type known per se and will be not be further described below.

Conveniently, the device 1 is designed to be positioned downstream of the distributor and upstream of the station 4 for compacting the mix M; furthermore, the hardening station is positioned downstream of the compaction station 4.

In an alternative embodiment, after distribution of the mix M in the support S, a station—not shown in the figures—may be provided for positioning a cover or a covering sheet F, preferably made of rubber, on the support S containing the mix M. Alternatively, the covering sheet F may be positioned manually by an operator on the support S being fed, above the mix M.

Figure 3:
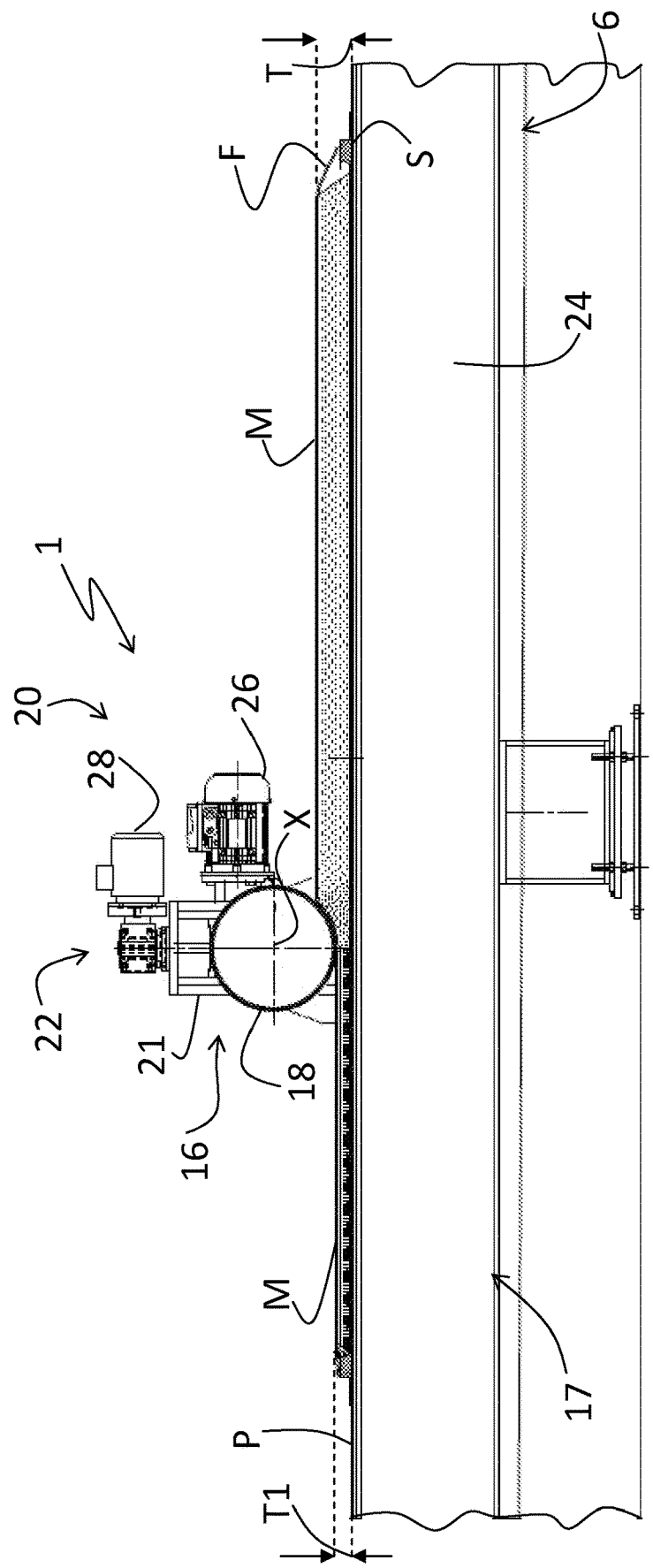
FIG. 3 shows a longitudinal view, on a larger scale, of the plant according to Figure and similar to that of FIG. 2, with the addition of an operational variant.

The support S containing the mix M with the covering sheet F positioned above it is shown in FIG. 3.

Furthermore, the compaction station 4 comprises a press 8, shown in FIG. 1. Preferably, the press 8 may comprise a bell member 10 movable vertically so as to define a chamber inside which the vacuum is created by means of the vacuum plant, not shown in the Figures, and a supporting surface 12 for the support S containing the mix M.

Moreover, the press 8 comprises a ram 14 movable between a raised rest position and a lowered position in contact with the mix M in order to perform compaction of the mix M.

The ram 14 may comprise a series of vibrating devices—not visible in the Figures—designed to generate a vibrating movement for compaction of the mix M arranged on the support S.

Therefore, the mix M is subject to compaction by means of vacuum vibro-compression inside the compaction station 4.

In accordance with the present invention, the device 1 comprises means 16 for pre-compaction and levelling of the mix M on the support S—shown more clearly in FIGS. 2 to 6—which act on the top surface of the mix M. Therefore, the device 1 according to the present invention may be defined as being a pre-compaction and levelling device for the mix M.

The pre-compaction and levelling means 16 have the dual function of reducing the volume and the thickness of the mix M previously deposited on the support S (pre-compaction action) and flattening or levelling the mix M, eliminating any surface irregularities, namely depressions or peaks (levelling action).

As regards the first function, it is emphasized first of all that the thickness of the compacted slab is equal to about half the thickness T of the layer of mix M deposited in the support S by the distributor.

In this connection, it is pointed out that the pre-compaction may reduce the thickness of the mix to a value T1 of between 55% and 70% with respect to the thickness T of the layer of mix M originally deposited in the support (see FIGS. 2, 3, 5 and 6).

Preferably, the thickness T of the layer of mix M originally deposited is reduced by an amount equal to about 40% by the pre-compaction and levelling means 16, while the vibro-compression may reduce the thickness of the mix M by about another 10%.

For example, in the case where a layer of mix M initially distributed in the support S has a thickness T of about 50 mm, at the end of the pre-compaction step the thickness T1 will be reduced to about 30 mm, while at the end of the vibro-compression step the final thickness will be equal to about 25 mm.

Figure 2:
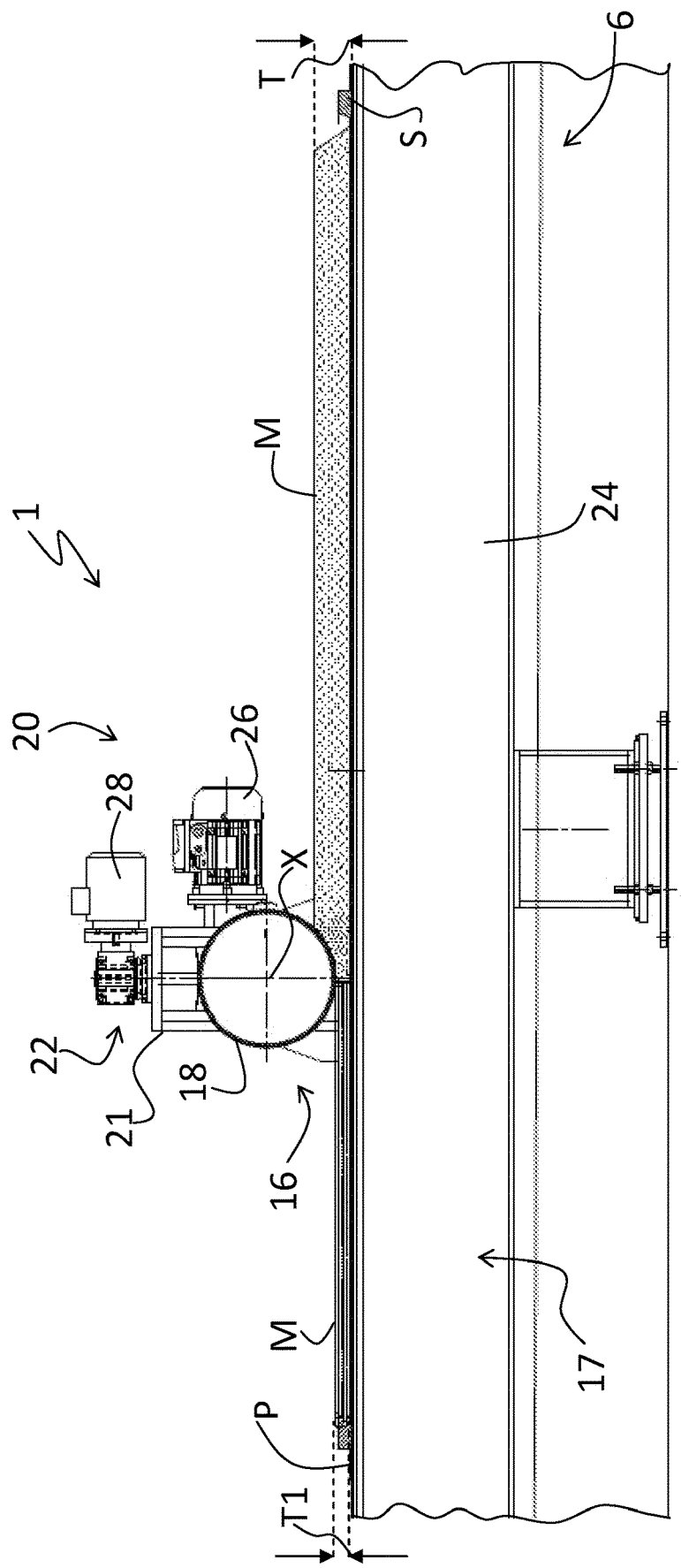
FIG. 2 shows a longitudinal view, on a larger scale, of FIG. 1 in which a detail of the plant in a preferred embodiment is visible.

Furthermore, the thickness T1 of the mix M after the pre-compaction step may be about 5-10 mm greater than the frames of the mould, as shown in FIGS. 2 and 3, and about 2 mm greater after the vibro-compression step.

The advantage resulting from the reduction of the thickness of the mix M by means of pre-compaction consists in the fact that the ram 14 of the press 8 is positioned at a lower height for compacting the mix M, differently from when the mix is not pre-compacted.

Considering moreover that the pre-compacted mix contains less air, the vacuum plant connected to the press 8 must discharge a smaller volume and therefore draw in a smaller amount of air. This advantage helps reduce the time needed for the vibro-compression step.

A further advantage consists in the fact that the ram 14 of the press 8 which acts on a layer of pre-compacted mix is less subject to sudden movements and stresses, with consequent benefits both for the structure of the press 8 and for the efficiency of vibro-compression.

The second function of the pre-compaction and levelling means 16 indicated above, namely the elimination of the surface irregularities. i.e. the peaks and depressions in the mix M by means of levelling, prevents the rarefied air from remaining trapped inside the depressions, and therefore avoids the formation in the compacted slab of air bubbles and consequent porosity.

The absence of the porosity helps ensure a uniform structure of the finished slab over the whole surface and therefore the slab does not have defects visible to the naked eye.

Conveniently, the pre-compacting and levelling means 16 and the supports S are movable relative to each other along the predetermined feeding direction L, indicated above with reference to the feeding means 6 of the plant 2.

In this connection, the plant 2 comprises means 17 for the relative movement of the pre-compaction and levelling means 16 with respect to the temporary support S or of the temporary support S with respect to the pre-compaction and levelling means 16 along the feeding direction L.

In the embodiment shown in the figures, these relative movement means 17 coincide with the aforementioned feeding mean 6 and may comprise a conveyor belt 24 designed to define a supporting surface P for the supports S, while the pre-compaction and levelling means 16 are stationary.

As shown in the figures, the supporting surface P is substantially horizontal and parallel to the ground.

In a manner known per se, both the pre-compaction and levelling means 16 and the conveyor belt 24 are connected to a single control unit—not shown in the figures—designed to control the selective activation thereof.

Moreover, the relative movement means 17 may be movable in both senses of travel along the feeding direction L, so as to bring the support S containing the mix M back opposite the pre-compaction and levelling means 16 in the case where the mix M must undergo a further pre-compaction step.

Advantageously, the pre-compaction and levelling means 16 are positioned at a predetermined distance both from the distributor and from the press 8 along the feeding direction L, so as to have simultaneously in each support station S a support S ready to undergo the respective processing operation.

In an alternative embodiment not shown in the figures a stationary supporting surface P could be provided for the supports S and the relative movement means 17 could be intended to move the pre-compaction and levelling means 16 with respect to the supports S along the feeding direction L.

In the preferred embodiment of the invention shown in the figures, the pre-compaction and levelling means 16 comprise at least one roller 18 acting on the surface of the mix M. The roller 18 has an axis of rotation X perpendicular to the feeding direction L and lying in a plane parallel to the feeding direction L. Therefore, the axis of rotation X of the roller 18 is also horizontal and parallel to the ground.

Figure 4:
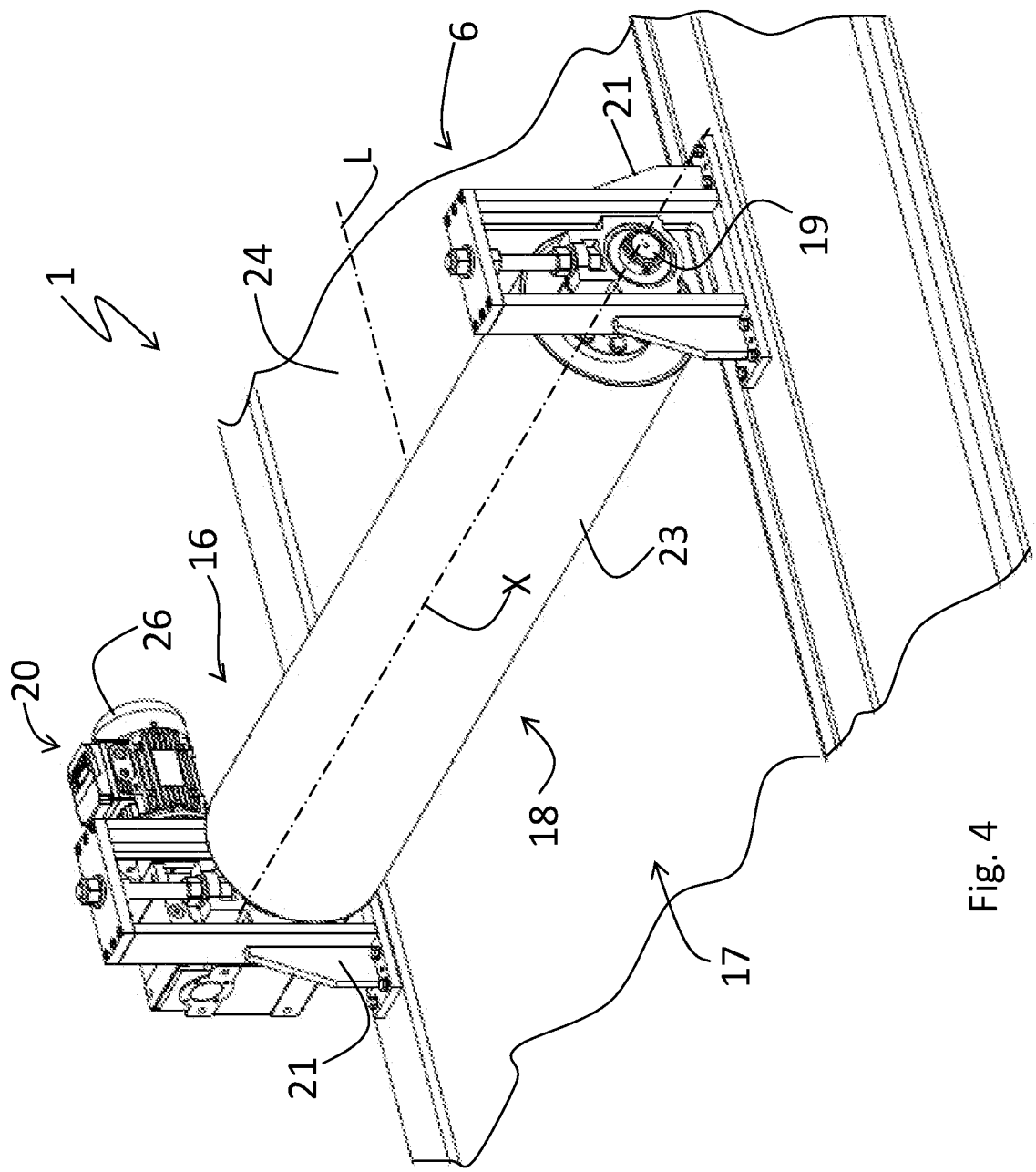
FIG. 4 shows a perspective view of the detail according to FIGS. 2 and 3.
Figure 5:
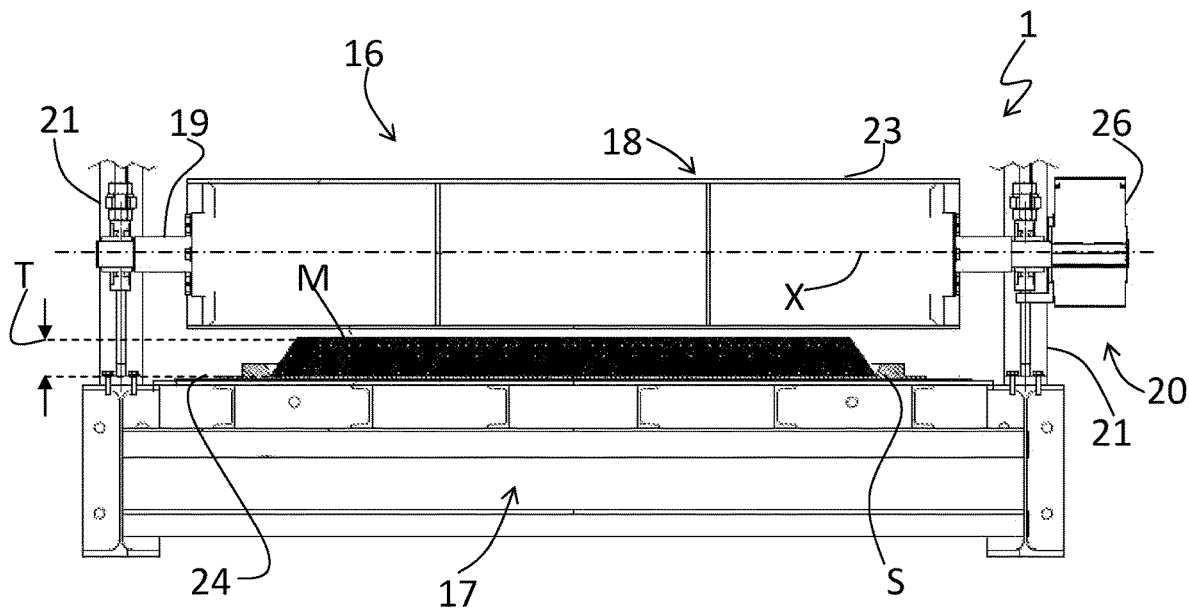
FIGS. 5 and 6 show side views and an enlarged view of the detail according to FIG. 2 in two different operating configurations.
Figure 6:
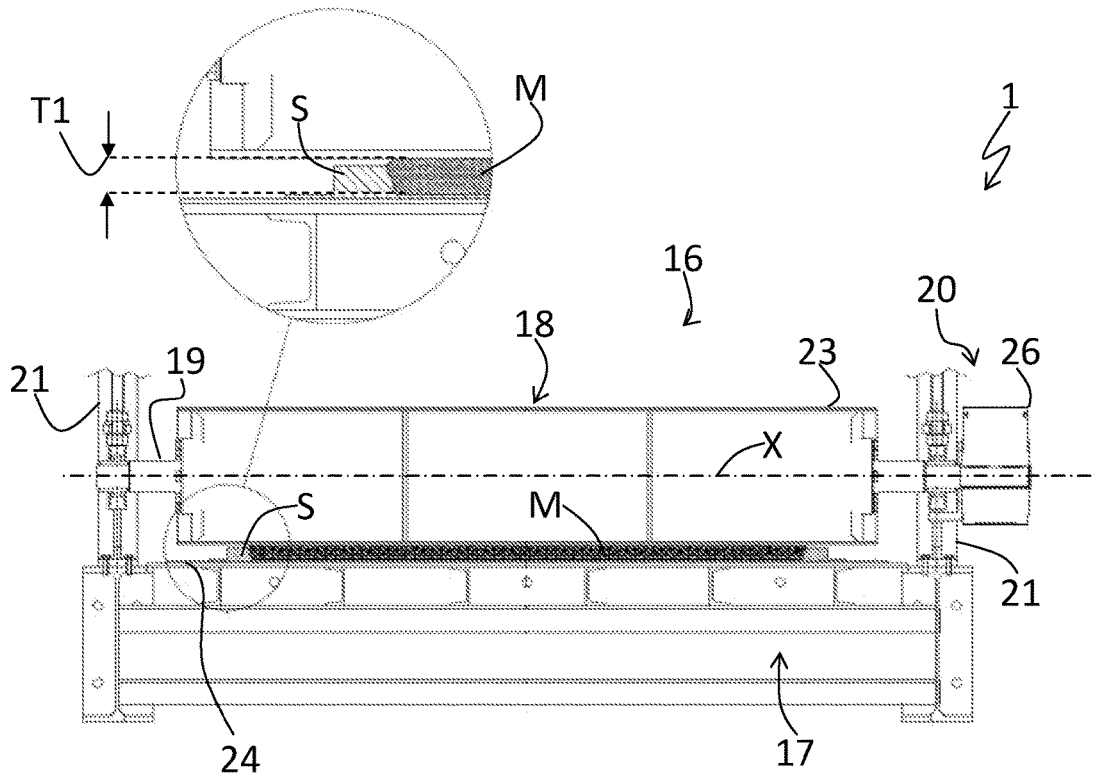

In a manner known per se, the roller 18 comprises a rotatable shaft 19 and a sleeve 23 which lines the shaft 19 and is designed to come into contact with the top surface of the mix M during the pre-compaction and levelling step (see FIGS. 4-6).

The shaft 19 of the roller 18 is supported at the ends by a pair of support elements 21, as illustrated more clearly in FIGS. 4-6, positioned on opposite sides of the conveyor belt 24 and designed to support the roller 18 above the conveyor belt 24.

In the embodiment shown in FIG. 3, the roller 18, in particular the sleeve 23, does not act directly on the mix M, but instead on the covering sheet F positioned above the mix M contained in the support S.

The provision of the sheet F prevents the roller 18 from becoming soiled during the pre-compaction and levelling step, but at the same time makes this step less efficient.

Moreover, the use of the roller 18 as a pre-compaction and levelling means makes a particular measure necessary, namely the slightly earlier interruption of the dispensing and distribution of the mix M in the support S, so that the end portion of the latter has a small empty space, as shown in FIGS. 2 and 3.

This particular measure is necessary since a portion, albeit small, of the mix M is conveyed by the rotating rollers 18; in this way, the empty space left in the support S is filled by the mix M conveyed by the roller 18 during feeding of the support S.

The at least one roller 18 may be idle, and therefore rotated by the mix M owing to the relative movement during feeding, but preferably is driven by a (gear)motor.

Suitably, the at least one motor-driven roller 18 may rotate with a speed of rotation adapted to and synchronized with the feeding speed of the support S, and therefore of the conveyor belt 24. This operating condition may be obtained with the aid of the control unit.

In this way, the peripheral speed of the roller 18 and the feeding speed of the support S are in the same sense and have the same value. Obviously, the same effect would be obtained also if the support S were kept stationary and the roller 18 were movable with respect to the support S.

Advantageously, a roller 18 with a larger diameter has an effect of pre-compacting and levelling the mix M, which is more efficient, but also has a greater cost compared to a roller 18 with a smaller diameter.

In this connection, a good compromise between a greater pre-compaction and levelling efficiency and a lower cost is obtained by using a roller 18 with a diameter of about 300-400 mm.

The roller 18 may be positioned both at a set height and at a variable height with respect to the bottom of the support S containing the mix M and therefore with respect to the supporting surface P of the conveyor belt 24.

In the second case, the device 1 comprises means 20 for moving the roller 18 along a predetermined direction towards or away from the support S so as to adjust the working height of the roller 18 with respect to the support S.

Preferably, the direction of movement of the roller 18 by the movement means 20 is vertical and perpendicular to the axis of rotation X and the feeding direction L.

By means of the movement means 20 it is possible to adjust the working height, namely the heightwise position, of the roller 18.

Alternatively, the roller 18 may operate at a height which is fixed and not predefined, but rests on the mix M and presses against the mix M with a predetermined working pressure.

In this embodiment, not shown in the figures, the movement means 20 may comprise pneumatic or hydraulic actuators which have the function of keeping the roller 18 pressed on the surface of the mix M and of pressing it with an adjustable pressure.

The means 20 for moving the roller 18 may comprise a respective drive, discussed in greater detail below, or alternatively one or more pneumatic or hydraulic actuators, not shown in the figures. Alternatively, the working height of the roller 18 may also be adjusted manually by an operator.

In the light of the above comments, the working height of the roller 18 may be adjusted depending on the thickness T1 of the mix M which is to be obtained following the pre-compaction step.

Preferably, at least two drives are provided: the drive 26 for rotation of the roller and the drive 28 for positioning it heightwise, illustrated more clearly in FIGS. 2 and 3. FIGS. 4 to 6 shows only the drive 26 for rotation of the roller.

The first drive 26 performs the rotation of the roller 18 about the horizontal axis of rotation X; the second drive 28 performs the lowering/raising of the roller 18 with respect to the supports S being fed.

The second drive 28 corresponds to the drive indicated above with reference to the means 20 for moving the roller 18 along the vertical direction and may comprise an angular transmission 22, as shown in FIGS. 2 and 3.

It is pointed out that the drives 26, 28 may be connected to the control unit so as to synchronize the movements of the roller 18 with respect to the feeding speed of the supports S.

As indicated above, in the case of an idle roller, its rotation about the axis of rotation X would be performed by the friction of the roller itself with the mix M distributed on the support S being fed.

In an alternative embodiment (not shown in the figures), the pre-compaction and levelling means 16 may comprise a plurality of rollers 18 which have respective horizontal axes of rotation X arranged in succession along the direction of feeding L of the supports S.

Advantageously, the working heights of these rollers could also be different from each other, for example they could be scalar downwards along the feeding direction L. Moreover, in this embodiment, the rollers could all be idle rollers.

The pre-compacting and levelling means 16 may also comprise elements different from the roller 18, such as at least a plate movable along a respective vertical direction, a rake rotatable about a vertical axis of rotation, or a scraper. In particular, the rake could be advantageously used with the monocoloured mixes. These alternative embodiments of the pre-compaction and levelling means 16 are not shown in the figures.

It is not to be excluded that each of these variants of the pre-compaction and levelling means 16 may be used in combination with the roller, or with the rollers, described above. However, the roller 18 represents the preferred embodiment of the pre-compaction and levelling means 16.

The present invention relates furthermore to a method for the production of slabs of composite stone material from a mix M containing granules of stone or ceramic or glass material and a binder. The method comprises the following steps:

a) dispensing and distribution of a layer of mix M with a predetermined thickness on a temporary support or mould S;

b) compaction by means of vacuum vibro-compression of the mix M arranged on the support S by means of the vacuum vibro-compression action;

c) hardening of the mix M to obtain the finished slabs.

In accordance with the present invention, upstream of the compaction step b) and downstream of the step a) for dispensing and distributing the mix M, it is envisaged performing a step d) for pre-compacting and levelling the mix M on the supports S so as to reduce the thickness T of the mix M before the compaction step.

Advantageously, the step d) may be performed by means of the device 1 comprising the pre-compaction and levelling means 16 described above, acting on the top surface of the mix M.

Furthermore, the step b) of compaction by means of vacuum vibro-compression of the mix M may be performed by means of the press 8 described above.

An optional step e) of positioning a cover or covering sheet F above the mix deposited on the support S between the step a) for distribution of the mix M and the step d) for pre-compaction and levelling of the mix M may also be envisaged.

In this case, the pre-compaction and levelling means 16 act on the covering sheet F, as shown in FIG. 3.

From the above description it is now clear how the plant and the method for the production of slabs of composite stone material are able to achieve advantageously the pre-defined objects.

In particular, it is clear how the device of the plant according to the present invention, by levelling and pre-compacting the mix, is able to speed up the following step of vibro-compression of the mix.

Moreover, by means of the plant according to the present invention the slabs have physical and aesthetic characteristics which are uniform over the whole of their surface and do not have defects which are visible to the naked eye, since the porous zones are eliminated owing to levelling of the mix and since the pre-compacted mix no longer has depressions inside which rarefied air may remain trapped, while the mix is situated inside the press before starting vibro-compression.

In the light of the above advantages, the method and the plant for the production of slabs according to the present invention therefore ensure production times which are shorter than those of the methods and the plants known in the sector.

Obviously, the above description of embodiments applying the innovative principles of the present invention is provided by way of example of these innovative principles and must therefore not be regarded as limiting the scope of the rights claimed herein.

In particular, the characteristic features of the various solutions shown here may be combined with each other according to specific needs and wishes, as may be easily imagined by the person skilled in the art.

The invention claimed is:

1. A plant for the production of slabs made of composite stone material from a mix containing granules of stone or ceramic or glass material and a binder, comprising:
   at least one temporary support or mould;
   a distributor for the mix designed to distribute a layer of mix on said at least one temporary support or mould;
   a station for performing compaction by means of vacuum vibro-compression of the mix arranged on the at least one temporary support or mould;
   a station for hardening the mix in order to form the finished slabs;
   wherein the plant comprises a device positioned downstream of said distributor and upstream of said compaction station and comprising means which act on the top surface of the mix for pre-compaction and levelling of the mix arranged on the at least one temporary support or mould; and
   wherein said pre-compaction and levelling means comprise at least one roller having a horizontal axis of rotation perpendicular to said feeding direction and lying in a plane parallel to said feeding direction, said at least one roller being positioned at a variable working height with respect to a horizontal supporting surface of the temporary support.

2. The plant according to claim 1, characterized in that the at least one temporary support and said pre-compaction and levelling means are movable relative to each other along a predetermined feeding direction.

3. The plant according to claim 2, further comprising means for relative movement of said pre-compaction and levelling means with respect to the at least one temporary support or of the at least one temporary support with respect to said pre-compaction and levelling means along said predetermined feeding direction.

4. The plant according to claim 3, characterized in that said relative movement means comprise a conveyor belt for feeding the at least one temporary support along said predetermined feeding direction, said conveyor belt defining the horizontal supporting surface parallel to the ground for the at least one temporary support being fed.

5. The plant according to claim 1, characterized in that said roller is motor-driven or idle.

6. The plant according to claim 5, characterized in that said motor-driven roller rotates with a speed of rotation adapted to and synchronized with the feeding speed of the at least one temporary support.

7. The plant according to claim 1, further comprising means for moving said roller along a predetermined direction towards or away from the at least one temporary support so as to adjust the working height of said roller with respect to the at least one temporary support.

8. The plant according to claim 7, characterized in that the predetermined direction of movement of said roller is vertical and perpendicular to said axis of rotation and said feeding direction.

9. The plant according to claim 1, further comprising means for moving said roller along a predetermined direction away from or towards the at least one temporary support, said movement means comprising pneumatic or hydraulic actuators having the function of keeping the roller pressed on the surface of the mix and of pressing it with an adjustable pressure against the mix.

10. The plant according to claim 9, characterized in that the predetermined direction of movement of said roller is vertical and perpendicular to said axis of rotation and said feeding direction.

11. The plant according to claim 1, wherein said at least one roller comprises a plurality of rollers arranged in succession.

12. A method for the production of slabs of composite stone material from a mix containing granules of stone or ceramic or glass material and a binder, characterized in that it comprises the following steps:
   (a) dispensing and distribution of a layer of mix with a predetermined thickness on a temporary support or mould;
   (b) compaction of said mix arranged on said temporary support or mould by means of a vacuum vibro-compression action;
   (c) hardening of the mix to obtain the slabs;
   wherein the method comprises, downstream of said step (a) for dispensing and distributing the mix and upstream of said compaction step (b), a step (d) for pre-compacting and levelling the mix on the temporary support so as to reduce the thickness of said mix, levelling it before said compaction step; and
   wherein said step (d) is performed by pre-compaction and levelling means comprising at least one roller having a horizontal axis of rotation perpendicular to said feeding direction and lying in a plane parallel to said feeding direction, said at least one roller being positioned at a variable working height with respect to a horizontal supporting surface of the temporary support.

13. The method according to claim 12, further comprising between said distribution step (a) and said step (d) for pre-compacting and levelling the mix, a step (e) for positioning a cover or covering sheet above the mix arranged on the temporary support.

14. A plant for the production of slabs made of composite stone material from a mix containing granules of stone or ceramic or glass material and a binder, comprising:
   at least one temporary support or mould;
   a distributor for the mix designed to distribute a layer of mix on said at least one temporary support or mould;
   a station for performing compaction by means of vacuum vibro-compression of the mix arranged on the at least one temporary support or mould;
   a station for hardening the mix in order to form the finished slabs;
   wherein the plant comprises a device positioned downstream of said distributor and upstream of said compaction station and comprising means which act on the top surface of the mix for pre-compaction and levelling of the mix arranged on the at least one temporary support or mould; and
   wherein said pre-compaction and levelling means comprise one of a plate, a rake, or a scraper, the one of plate, rake, or scraper having a horizontal axis of rotation perpendicular to said feeding direction and lying in a plane parallel to said feeding direction and being positioned at a variable working height with respect to a horizontal supporting surface of the temporary support.

15. The plant according to claim 14, characterized in that the at least one temporary support and said pre-compaction and levelling means are movable relative to each other along a predetermined feeding direction.

16. The plant according to claim 15, characterized in that said pre-compaction and levelling means comprise the plate movable perpendicularly relative to said feeding direction.

17. The plant according to claim 15, characterized in that said pre-compaction and levelling means comprise the rake rotating about an axis perpendicular to said feeding direction.

18. The plant according to claim 15, characterized in that said pre-compaction and levelling means comprise the scraper.

* * * * *